United States Patent
Sano (10) Patent No.: US 12,098,769 B2
(45) Date of Patent: Sep. 24, 2024

(54) TRANSMISSION CONTROL DEVICE

(71) Applicant: KAWASAKI MOTORS, LTD., Akashi (JP)

(72) Inventor: Katsuya Sano, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 45 days.

(21) Appl. No.: 18/066,253

(22) Filed: Dec. 14, 2022

(65) Prior Publication Data

US 2023/0184326 A1    Jun. 15, 2023

(30) Foreign Application Priority Data

Dec. 15, 2021  (JP) ................................ 2021-203482

(51) Int. Cl.
| | |
|---|---|
| *F16H 61/04* | (2006.01) |
| *B60W 30/19* | (2012.01) |
| *F16H 61/08* | (2006.01) |
| *F16H 63/50* | (2006.01) |

(52) U.S. Cl.
CPC ..... *F16H 61/0403* (2013.01); *F16H 61/0437* (2013.01); *F16H 61/08* (2013.01); *F16H 63/502* (2013.01); *B60W 30/19* (2013.01); *F16H 2306/20* (2013.01)

(58) Field of Classification Search
CPC .. F16H 61/0403; F16H 61/0437; F16H 61/08; F16H 63/502; F16H 2306/20; B60W 30/19; B60Y 2200/12; B60Y 2200/92
See application file for complete search history.

(56) References Cited

U.S. PATENT DOCUMENTS

| | | | | |
|---|---|---|---|---|
| 7,347,116 B2 * | 3/2008 | Sakamoto | ............. | B60W 20/30 74/331 |
| 2003/0069103 A1 * | 4/2003 | Ibamoto | ................. | B60L 15/20 475/5 |
| 2009/0270224 A1 | 10/2009 | Minami | | |
| 2015/0166047 A1 * | 6/2015 | Pettersson | ............. | B60W 30/19 180/65.265 |

FOREIGN PATENT DOCUMENTS

| | | | | |
|---|---|---|---|---|
| CN | 111356601 A | * | 6/2020 | ............. B60K 17/24 |
| DE | 102006003725 A1 | | 8/2007 | |
| JP | 2009264519 A | | 11/2009 | |

* cited by examiner

*Primary Examiner* — Tinh Dang
(74) *Attorney, Agent, or Firm* — PROCOPIO, CORY, HARGREAVES & SAVITCH LLP (57) ABSTRACT

There is provided a transmission control device that controls a first prime mover and a second prime mover of which output responsiveness is different from each other. A processing circuitry of the transmission control device executes a process including: in response to a shift command, calculating each target rotational speed of the first prime mover and the second prime mover for a synchronous control that brings one of rotational speeds of a dog and a transmission gear at the second transmission gear position close to the other; and determining a first timing or a second timing such that the second timing is later than the first timing, the first timing being a time at which the synchronous control of the first prime mover is started, and the second timing being a time at which the synchronous control of the second prime mover is started.

12 Claims, 8 Drawing Sheets

ENGAGEMENT STATE WITH FIRST GEAR

FIG. 4

NON-ENGAGEMENT STATE

TRANSMISSION CONTROL DEVICE

CROSS-REFERENCE TO RELATED APPLICATIONS

This application is based on and claims priority under 35 USC 119 from Japanese Patent Application No. 2021-203482 filed on Dec. 15, 2021, the contents of which are incorporated herein by reference.

TECHNICAL FIELD

The present disclosure relates to a transmission control device.

BACKGROUND ART

In the related art, in a dog clutch type gear transmission, at the time of shifting from a current transmission gear position to a next transmission gear position, a dog is disengaged from a gear pair having a certain reduction ratio, and then is moved along an input shaft or an output shaft of the gear transmission to be engaged with a gear pair having another reduction ratio. Thus, the gear pair for transmitting a driving force of a prime mover from the input shaft to the output shaft is switched (for example, JP2009-264519A).

In the dog clutch type gear transmission, it is desired that at the time of moving the dog, the dog is smoothly engaged with a transmission gear at the next transmission gear position.

SUMMARY OF INVENTION

Accordingly, the present disclosure provides a transmission control device capable of implementing smooth engagement of a dog with a gear.

A transmission control device controls a first prime mover and a second prime mover of which output responsiveness to an output change command is different from each other in a system, the system including the first prime mover, the second prime mover, and a gear transmission, the gear transmission including an input shaft to which a driving force of the first prime mover and a driving force of the second prime mover are transmitted, an output shaft, a plurality of transmission gears, and a dog configured to move to the input shaft and the output shaft to be engaged selectively with one of the plurality of transmission gears. The control device includes: a processing circuitry. The transmission control device causes the processing circuitry to execute a process, the process including: in response to a shift command for shifting from a first transmission gear position to a second transmission gear position, calculating a target rotational speed of the first prime mover and a target rotational speed of the second prime mover for a synchronous control that brings one of a rotational speed of the dog at the second transmission gear position and a rotational speed of the transmission gear at the second transmission gear position close to the other; and determining a first timing or a second timing such that the second timing is later than the first timing, the first timing being a time at which the synchronous control of the first prime mover is started, and the second timing being a time at which the synchronous control of the second prime mover is started.

According to the present disclosure, it is possible to provide a transmission control device capable of implementing smooth engagement of a dog with a gear.

DESCRIPTION OF EMBODIMENTS

Embodiments will be described hereinafter with reference to the accompanying drawings.

Figure 1:
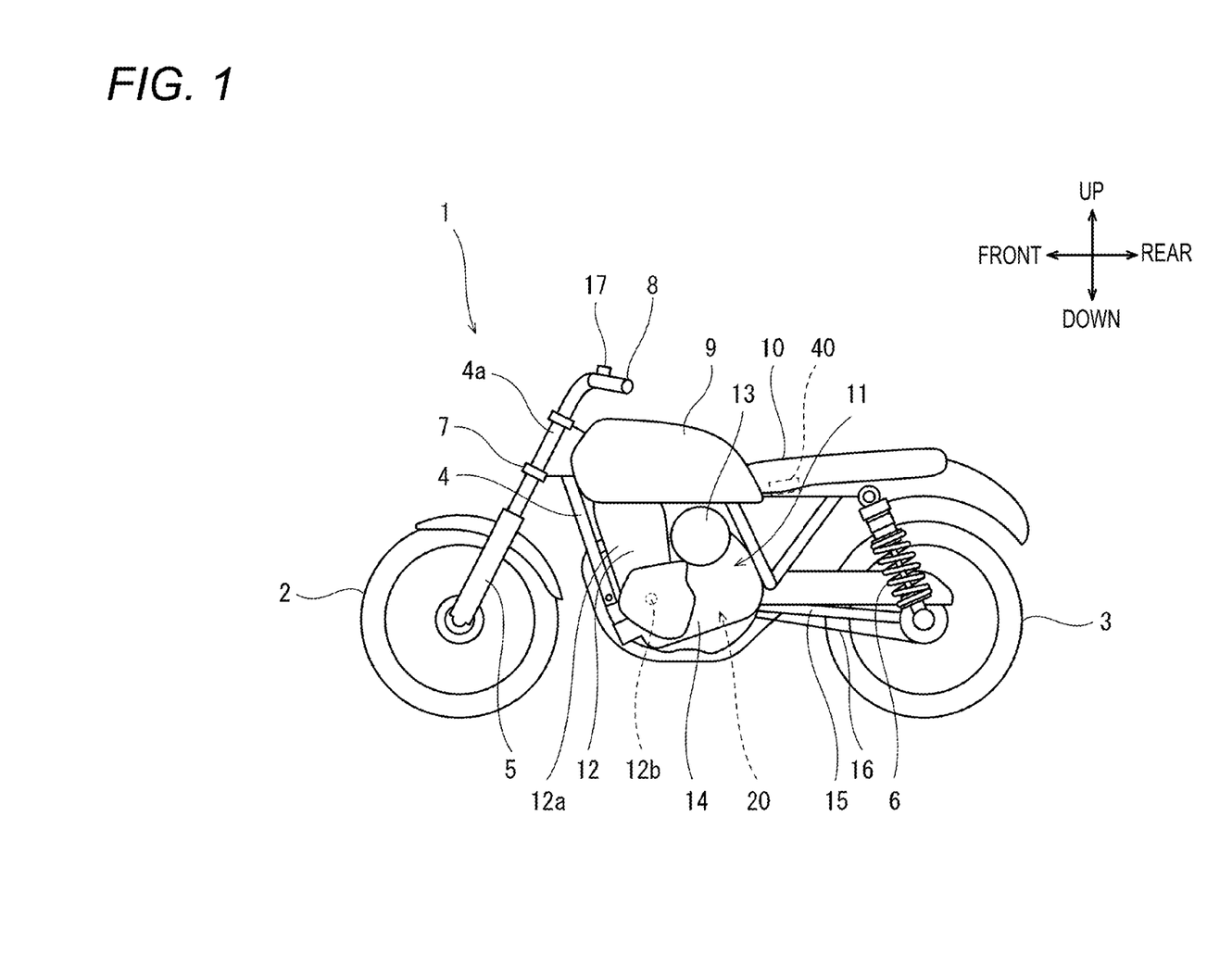
FIG. 1 is a left side view of a motorcycle including a transmission control device according to an embodiment.

FIG. 1 is a left side view of a motorcycle 1 including a transmission control device 40 according to an embodiment. The motorcycle 1 is an example of a straddle vehicle on which a rider straddles, and is a hybrid vehicle. Directions in the following description are based on a direction viewed from the rider of the motorcycle 1, a front-rear direction corresponds to a vehicle length direction, and a left-right direction corresponds to a vehicle width direction.

The motorcycle 1 includes a front wheel 2, a rear wheel 3, a vehicle body frame 4, a front suspension 5 that connects the front wheel 2 to a front portion of the vehicle body frame 4, and a rear suspension 6 that connects the rear wheel 3 to a rear portion of the vehicle body frame 4. The front suspension 5 is coupled to a bracket 7 disposed at an interval in an up-down direction. A steering shaft connected to the bracket 7 is supported by a head pipe 4a, which is a part of the vehicle body frame 4, so as to be angularly displaceable. The steering shaft is provided with a handle 8 that is gripped by hands of the rider. A fuel tank 9 is provided at a rear side of the handle 8, and a seat 10 on which the rider sits is provided at a rear side of the fuel tank 9.

A swing arm 15 that supports the rear wheel 3 and extends in the front-rear direction is supported on the vehicle body frame 4 so as to be angularly displaceable. In addition, a power unit 11 is mounted on the vehicle body frame 4 between the front wheel 2 and the rear wheel 3. The power unit 11 includes a first prime mover and a second prime mover which are two traveling drive sources. The first prime mover is an engine 12, which is an internal combustion engine. The second prime mover is a drive motor 13, which is an electric motor.

The engine 12 includes a cylinder 12a and a crankshaft 12b coupled to a piston in the cylinder. The crankshaft 12b of the engine 12 is accommodated in a crankcase 14. In addition, a gear transmission 20 is disposed at a rear side of the engine 12. The gear transmission 20 is accommodated in the crankcase 14. A shift switch 17 for changing a transmission gear position, which is a shift position of the gear transmission 20, is provided at a left grip of the handle 8. The transmission control device 40 is disposed below the seat 10. The transmission control device 40 controls the engine 12, the drive motor 13, and a clutch actuator 19 and a shift actuator 30, which will be described later.

Figure 2:
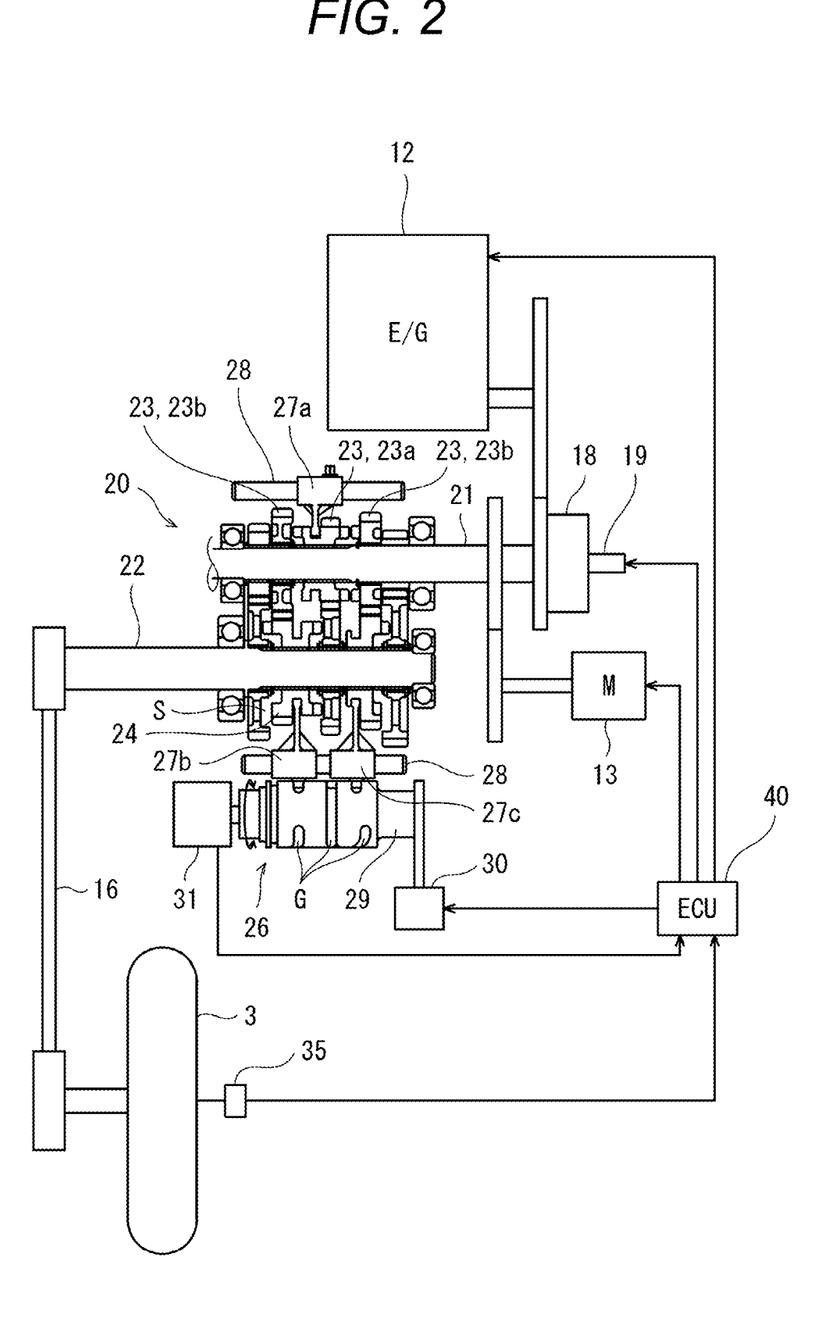
FIG. 2 is a schematic diagram of a power system of the motorcycle in FIG. 1.

FIG. 2 is a schematic diagram of a power system of the motorcycle 1 in FIG. 1. The gear transmission 20 includes an input shaft 21, an output shaft 22, and a plurality of transmission gear pairs 23.

A driving force of at least one of the first prime mover and the second prime mover can be transmitted to the input shaft 21. Specifically, a main clutch 18 is interposed in a power transmission path between the crankshaft 12b of the engine 12 and the input shaft 21 of the gear transmission 20. For example, the main clutch 18 is a multi-plate clutch. A rotational power of the crankshaft 12b of the engine 12 is input to the input shaft 21 via the main clutch 18. The main clutch 18 is driven by the clutch actuator 19 to disconnect or connect the power transmission path from the crankshaft 12b to the input shaft 21. In addition, a rotational power of a rotation shaft of the drive motor 13 is input to the input shaft 21. Power can be simultaneously transmitted to the input shaft 21 from both the engine 12, which is the first prime mover, and the drive motor 13, which is the second prime mover.

The output shaft 22 is disposed parallel to the input shaft 21. Hereinafter, a direction parallel to the input shaft 21 and the output shaft 22 is referred to as an "axial direction". The plurality of transmission gear pairs 23 are arranged in the axial direction. The plurality of transmission gear pairs 23 have different reduction ratios. The reduction ratio may also be referred to as a gear ratio or a transmission ratio. Each transmission gear pair 23 includes one transmission gear 23 provided coaxially with the input shaft 21 and one transmission gear 23 provided coaxially with the output shaft 22.

Of the two transmission gears 23 included in each transmission gear pair 23, one transmission gear 23 is a gear (hereinafter, referred to as a "co-rotation gear") 23a that rotates integrally with the input shaft 21 or the output shaft 22 that is coaxial with the one transmission gear 23. For example, the co-rotation gear 23a is assembled to the input shaft 21 or the output shaft 22 by spline fitting. Of the two transmission gears 23 included in each transmission gear pair 23, the other transmission gear 23 is a gear (hereinafter, referred to as an "idle gear") 23b that is rotatable relative to the input shaft 21 or the output shaft 22 that is coaxial with the other transmission gear 23.

The co-rotation gear 23a and the idle gear 23b of each transmission gear pair 23 are always engaged with each other. In the present embodiment, the co-rotation gears 23a and the idle gears 23b are alternately arranged in the axial direction on the input shaft 21. Similarly, the idle gears 23b and the co-rotation gears 23a are alternately arranged in the axial direction on the output shaft 22. In FIG. 2, in order to avoid complication, only some of the co-rotation gears and the idle gears are denoted by reference numerals, and the reference numerals of the other gears are omitted.

The gear transmission 20 is a dog clutch type transmission. The gear transmission 20 includes a plurality of dogs 24 corresponding to a plurality of transmission gear positions, respectively, and a shift mechanism 26.

The dogs 24 are movable in the axial direction with respect to the input shaft 21 and the output shaft 22 by the shift mechanism 26. One of the plurality of dogs 24 is moved in the axial direction by the shift mechanism 26, and is selectively engaged with one of the plurality of transmission gear pairs 23. Accordingly, one transmission gear pair 23 engaged with the dog 24 is brought into a state in which the driving force can be transmitted from the input shaft 21 to the output shaft 22. That is, the driving force transmitted to the input shaft 21 is transmitted to the output shaft 22 via the transmission gear pair 23 engaged with the dog 24. A rotational power of the output shaft 22 is transmitted to the rear wheel 3, which is a drive wheel, via an output transmission member 16. The output transmission member 16 is, for example, a chain, a belt, or the like.

The shift mechanism 26 includes shift forks 27a, 27b, and 27c, a support shaft 28, and a shift drum 29. The shift forks 27a, 27b, and 27c are slidably supported by the support shaft 28 provided parallel to the input shaft 21 and the output shaft 22. As will be described later, in the present embodiment, some of the co-rotation gears 23a are integrated with the dogs 24. One end portion of the shift fork 27a is connected to the co-rotation gear 23a that is externally mounted on the input shaft 21 and moves integrally with the dog 24. In addition, one end portions of the shift forks 27b and 27c are connected to the respective co-rotation gears 23a that are externally mounted on the output shaft 22 and move integrally with the dogs 24.

In addition, other end portions of the shift forks 27a, 27b, and 27c are fitted into respective guide grooves G of the shift drum 29. When the shift drum 29 rotates, the shift forks 27a, 27b, and 27c guided by the respective guide grooves G move the corresponding dogs 24 in the axial direction. The dog 24 enters an accommodation space S, which will be described later, of the idle gear 23b to be engaged with the idle gear 23b with a play. In addition, the dog 24 moves out of the accommodation space S, which will be described later, of the idle gear 23b to be disengaged from the idle gear 23b.

Engagement between the dog 24 and the transmission gear pair 23 will be described in more detail with reference to FIGS. 2 and 3 to 5 as appropriate.

Figure 3:
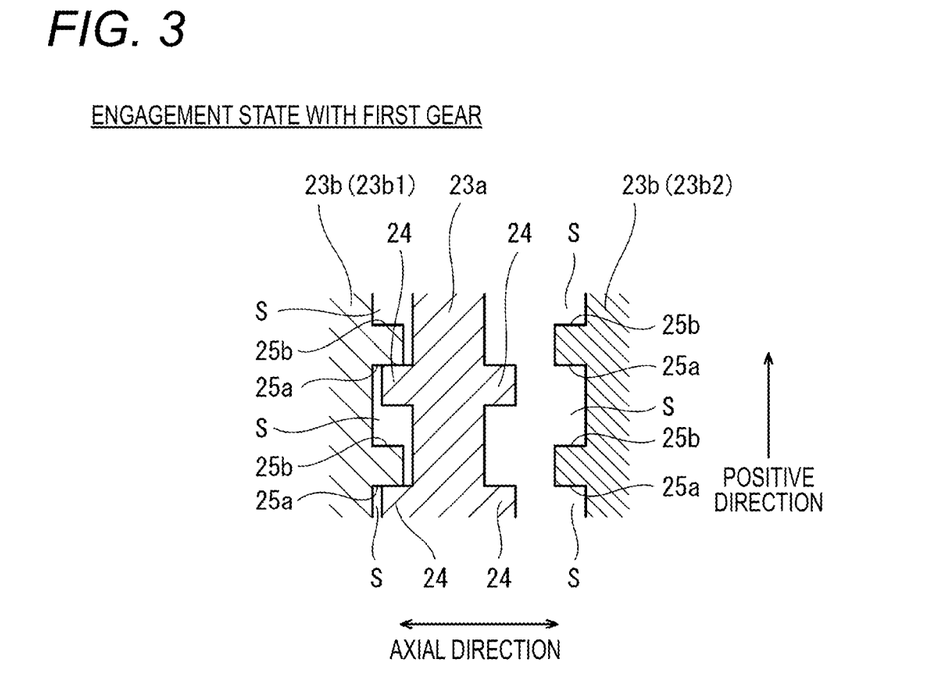
FIG. 3 is an enlarged schematic diagram showing an example of an engagement state between a transmission gear and a dog before a shift operation.
Figure 4:
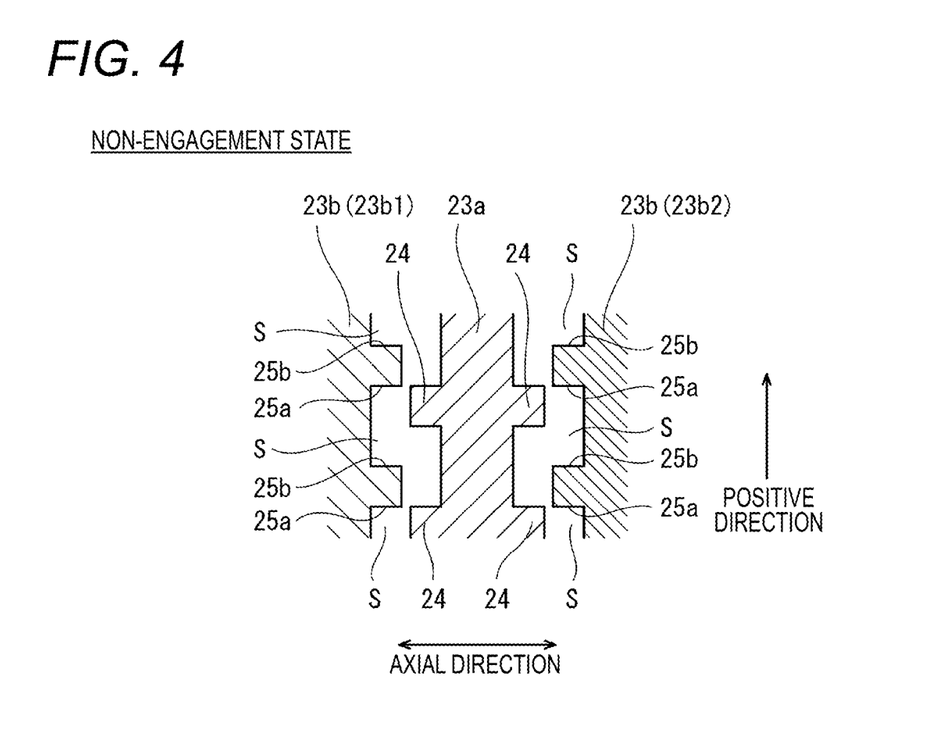
FIG. 4 is an enlarged schematic diagram showing an example of a non-engagement state of the dog.
Figure 5:
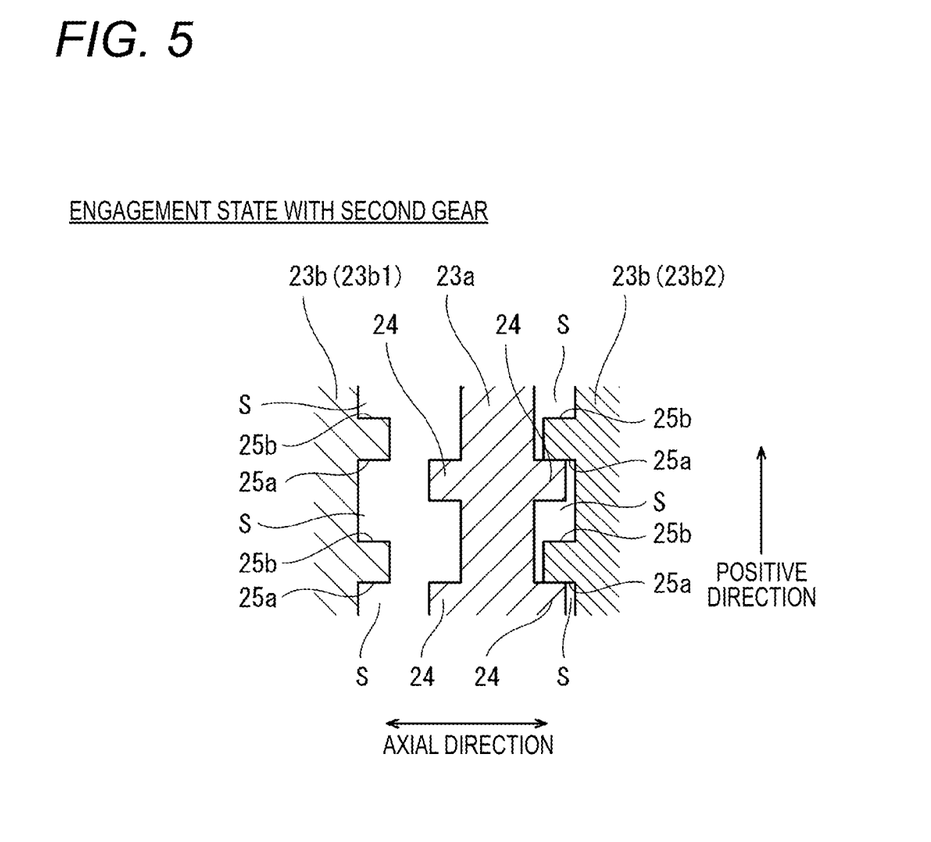
FIG. 5 is an enlarged schematic arrangement diagram showing an example of an engagement state between the transmission gear and the dog after the shift operation.

FIGS. 3 to 5 are enlarged views of some transmission gears 23 provided coaxially with the input shaft 21 as viewed in a direction orthogonal to the axial direction. FIGS. 3 to 5 show an example of a movement of the dog 24 at the time of shifting from a current transmission gear position to a next transmission gear position in chronological order. FIG. 3 is an enlarged schematic diagram showing an example of an engagement state between the transmission gear 23 (more specifically, the idle gear 23b) and the dog 24 before a shift operation. FIG. 4 is an enlarged schematic diagram showing an example of a non-engagement state of the dog 24. FIG. 5 is an enlarged schematic diagram showing an example of an engagement state between the transmission gear 23 (more specifically, the idle gear 23b) and the dog 24 after the shift operation.

Hereinafter, for convenience, the current transmission gear position is referred to as a first transmission gear position, and of the transmission gear pair 23 corresponding to the first transmission gear position, the gear 23 with which the dog 24 can be engaged is referred to as a first gear (or a current gear or a pre-transmission gear) 23b1. In addition, a next transmission gear position after the dog 24 shifts from the current transmission gear position based on a shift command is referred to as a second transmission gear position, and of the transmission gear pair 23 corresponding to the second transmission gear position, the gear 23 with which the dog 24 can be engaged is referred to as a second gear (or a next gear or a post-transmission gear) 23b2.

As shown in FIG. 3, in the present embodiment, some co-rotation gears 23a are integrated with the dogs 24, and are movable in the axial direction with respect to the input shaft 21 or the output shaft 22 together with the dogs 24. Specifically, the dogs 24 are provided so as to protrude in the axial direction from an axial end surface of the co-rotation gear 23a. The dogs 24 are formed by a plurality of projections arranged at predetermined intervals in a circumferential direction of the co-rotation gear 23a on the end surface of the co-rotation gear 23a.

The dog 24 and the idle gear 23b axially opposed to the co-rotation gear 23a include the accommodation space S into which the dog 24 can enter. The accommodation space S is opened on a side in the axial direction where the dog 24 is disposed such that the moving dog 24 can enter the accommodation space S. In the present embodiment, the accommodation space S is formed by a plurality of projections arranged at predetermined intervals in a circumferential direction of the idle gear 23b on an axial end surface of the idle gear 23b. That is, the accommodation space S is a space formed between the projections adjacent to each other in the circumferential direction of the idle gear 23b on the end surface of the idle gear 23b. The accommodation space S may be a hole formed in the axial end surface of the idle gear 23b. That is, the accommodation space S may be opened or may not be opened in a radial direction of the idle gear 23b.

As shown in FIG. 3, the transmission gear 23 including the accommodation space S includes a first surface 25a and a second surface 25b which define the accommodation space S in a circumferential direction of the transmission gear 23. The first surface 25a is a surface against which the dog 24 that entered the accommodation space S abuts when torque is transmitted to the output shaft 22 in a predetermined positive direction. The second surface 25b is a surface against which the dog 24 that entered the accommodation space S abuts when torque is transmitted to the output shaft 22 in a negative direction opposite to the positive direction.

In FIGS. 3 to 5, the axial direction and the positive direction are indicated by arrows. In the present description, the positive direction means a generation direction of the torque of the input shaft 21 and the output shaft 22 in a direction in which the output shaft 22 is accelerated when a vehicle (the motorcycle 1 in the present example) moves forward. That is, the first surface 25a is a surface against which the dog 24 that entered the accommodation space S abuts when rotation of the output shaft 22 is accelerated, and the second surface 25b is a surface against which the dog 24 that entered the accommodation space S abuts when the rotation of the output shaft 22 is decelerated. In particular, in the present example, the first surface 25a is a surface against which the dog 24 that entered the accommodation space S abuts while the vehicle (the motorcycle 1 in the present example) is accelerating forward, and the second surface 25b is a surface against which the dog 24 that entered the accommodation space S abuts while the vehicle (the motorcycle 1 in the present example) is decelerating.

As shown in FIG. 3, the dog 24 abuts against the first surface 25a of the first gear 23b1 so as to rotate together with the first gear 23b1. Thus, the transmission gear pair 23 with which the dog 24 is engaged transmits the torque of the input shaft 21 to the output shaft 22.

The co-rotation gear 23a integrated with the dog 24 is slidable with respect to the input shaft 21 or the output shaft 22 coaxial with the co-rotation gear 23a. The co-rotation gear 23a is moved by the shift mechanism 26.

As shown in FIG. 4, the co-rotation gear 23a that rotates integrally with the dog 24 moves in a direction away from the first gear 23b1, such that the dog 24 comes out of the accommodation space S of the first gear 23b1, and the engagement is released. In a state in which none of the transmission gear pairs 23 of the gear transmission 20 is engaged with the dog 24, that is, the non-engagement state, the transmission of torque between the input shaft 21 and the output shaft 22 is interrupted.

As shown in FIG. 5, when the dog 24 protruding from the co-rotation gear 23a enters the accommodation space S of the second gear 23b2 and abuts against the first surface 25a of the second gear 23b2, the second gear 23b2 rotates together with the co-rotation gear 23a. Thus, the transmission gear pair 23 at the second transmission gear position including the idle gear 23b as the second gear 23b2 and the co-rotation gear 23a meshing with the idle gear 23b transmits the driving force from the input shaft 21 to the output shaft 22.

Figure 6:
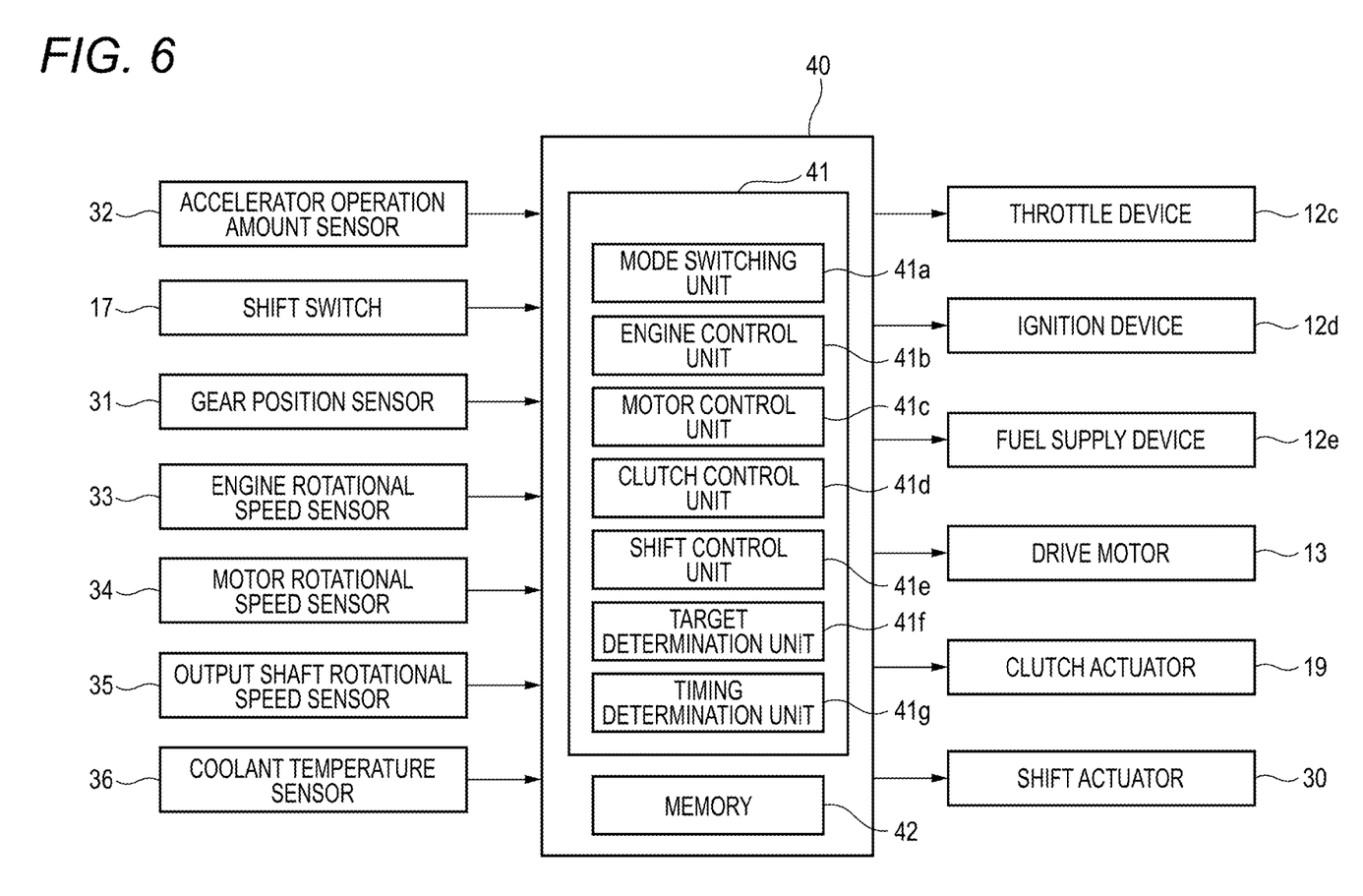
FIG. 6 is a block diagram showing the transmission control device and input and output thereof.

FIG. 6 is a block diagram showing the transmission control device 40 and input and output thereof. The transmission control device 40 controls the engine 12, the drive motor 13, the clutch actuator 19, and the shift actuator 30. As shown in FIG. 6, the transmission control device 40 is input with detection signals from an accelerator operation amount sensor 32, the shift switch 17, a gear position sensor 31, an engine rotational speed sensor 33, a motor rotational speed sensor 34, an output shaft rotational speed sensor 35, and a coolant temperature sensor 36. The transmission control device 40 outputs control signals to a throttle device 12c, an ignition device 12d, a fuel supply device 12e, the drive motor 13, the clutch actuator 19, and the shift actuator 30.

The accelerator operation amount sensor 32 detects an accelerator operation amount (an acceleration request amount) of the rider.

The shift switch 17 sends the shift command to the transmission control device 40 in response to a manual operation by the rider. For example, the shift command is a shift-up command or a shift-down command. The shift-up command is a command for increasing the transmission gear position of the gear transmission 20. More specifically, the shift-up command is a command for increasing the reduction ratio of the output shaft 22 with respect to the input shaft 21. The shift-down command is a command for decreasing the transmission gear position of the gear transmission 20. More specifically, the shift-down command is a command for reducing the reduction ratio of the output shaft 22 with respect to the input shaft 21.

The gear position sensor 31 detects a rotation angle of the shift drum 29. Based on the rotation angle of the shift drum 29, it is possible to detect which one of the plurality of transmission gear pairs 23 of the gear transmission 20 is in a selected state, that is, which transmission gear position is in.

The engine rotational speed sensor 33 detects a rotational speed of an output shaft of the engine 12 (hereinafter, also referred to as an "engine rotational speed"). The motor rotational speed sensor 34 detects a rotational speed of an output shaft of the drive motor 13 (hereinafter, also referred to as a "motor rotational speed").

The output shaft rotational speed sensor 35 detects a rotational speed of the output shaft 22. The output shaft rotational speed sensor 35 may be provided on the output shaft 22 to directly detect the rotational speed of the output shaft 22. Alternatively, the output shaft rotational speed sensor 35 may indirectly detect the rotational speed of the output shaft 22 by detecting another parameter. For example, the output shaft rotational speed sensor 35 may be a wheel rotational speed sensor that detects a rotational speed of the rear wheel 3, which is a drive wheel (see FIG. 2).

The coolant temperature sensor 36 detects a temperature of a coolant that cools the engine 12.

The throttle device 12c adjusts an intake air amount of the engine 12. For example, the throttle device 12c is an electronically controlled throttle device that opens and closes a throttle valve by a motor. The ignition device 12d ignites an air-fuel mixture in a combustion chamber of the engine 12. The ignition device 12d is, for example, an ignition plug. The fuel supply device 12e supplies fuel to the engine 12.

The shift actuator 30 generates power for moving the dog 24. Specifically, the shift actuator 30 is controlled by the transmission control device 40 to rotationally drive the shift drum 29 of the shift mechanism 26. The transmission control device 40 controls the shift actuator 30 in accordance with an operation on the shift switch 17 by the rider. The shift actuator 30 is, for example, an electric motor.

The transmission control device 40 includes one or more processors 41 on a hardware surface. Each processor 41 includes a calculation device, a volatile memory, and a nonvolatile memory. The processor 41 is an example of a processing circuit, which may be referred to as a processing circuitry. The processor 41 performs calculation processing by the calculation device using the volatile memory in accordance with a program stored in the nonvolatile memory, and outputs a control signal corresponding to the detection signal input to the transmission control device 40. The transmission control device 40 includes, on a software surface, a mode switching unit 41a, an engine control unit 41b, a motor control unit 41c, a clutch control unit 41d, a shift control unit 41e, a target determination unit 41f, and a timing determination unit 41g. In FIG. 6, the one or more processors 41 are shown as one block, and functional blocks 41a, 41b, 41c, 41d, 41e, 41f, and 41g are collectively shown therein. In addition, the transmission control device 40 includes a memory 42. The memory 42 includes a volatile memory and a nonvolatile memory.

The mode switching unit 41a selects one mode from a plurality of traveling modes including an EGV mode, an EV mode, and an HEV mode.

The EGV mode is a mode in which the engine 12 is driven without driving the drive motor 13, and the rear wheel 3, which is a drive wheel, is driven by the rotational power of only the engine 12. In the EGV mode, the main clutch 18 is brought into a connection state by the clutch actuator 19 such that the rotational power of the engine 12 is transmitted to the rear wheel 3, which is a drive wheel, via the gear transmission 20.

The EV mode is a mode in which the engine 12 is stopped and the rear wheel 3, which is a drive wheel, is driven by the power generated by the drive motor 13. In the EV mode, the main clutch 18 is brought into a disconnection state by the clutch actuator 19 such that the engine 12 does not become resistant when the drive motor 13 is driven.

The HEV mode is a mode in which the rear wheel 3, which is a drive wheel, is driven by the power generated by the drive motor 13 and the engine 12. In the HEV mode, the main clutch 18 is brought into the connection state by the clutch actuator 19 such that the rotational power of the engine 12 is transmitted to the rear wheel 3 via the gear transmission 20.

The engine control unit 41b controls the throttle device 12c, the ignition device (the ignition plug) 12d, and the fuel supply device 12e to adjust an output of the engine 12. For example, the engine control unit 41b performs torque control such that output torque of the engine 12 becomes a value corresponding to the accelerator operation amount of the rider. The motor control unit 41c controls the drive motor 13 to adjust an output of the drive motor 13. For example, the motor control unit 41c performs torque control such that output torque of the drive motor 13 becomes a value corresponding to the accelerator operation amount of the rider. The engine control unit 41b and the motor control unit 41c perform control according to the traveling mode selected by the mode switching unit 41a.

The clutch control unit 41d controls the clutch actuator 19 to switch the state of the main clutch 18. For example, when the EV mode is selected by the mode switching unit 41a, the clutch control unit 41d brings the main clutch 18 into the disconnection state and when the EGV mode or the HEV mode is selected by the mode switching unit 41a, the clutch control unit 41d brings the main clutch 18 into the connection state.

The shift control unit 41e, the target determination unit 41f, and the timing determination unit 41g relate to transmission processing executed when the shift command is generated, that is, when the shift command is received from the shift switch 17. The shift control unit 41e controls the shift actuator 30 in accordance with the acquired shift command. The target determination unit 41f determines a target engine rotational speed, a target motor rotational speed, and a target drum angle, at the time of shifting the dog 24. The timing determination unit 41g determines a timing at which the synchronous control of the engine 12 is started, a timing at which the synchronous control of the drive motor 13 is started, and a timing at which the control for moving the dog 24 is started.

<Transmission Processing>

Figure 7:
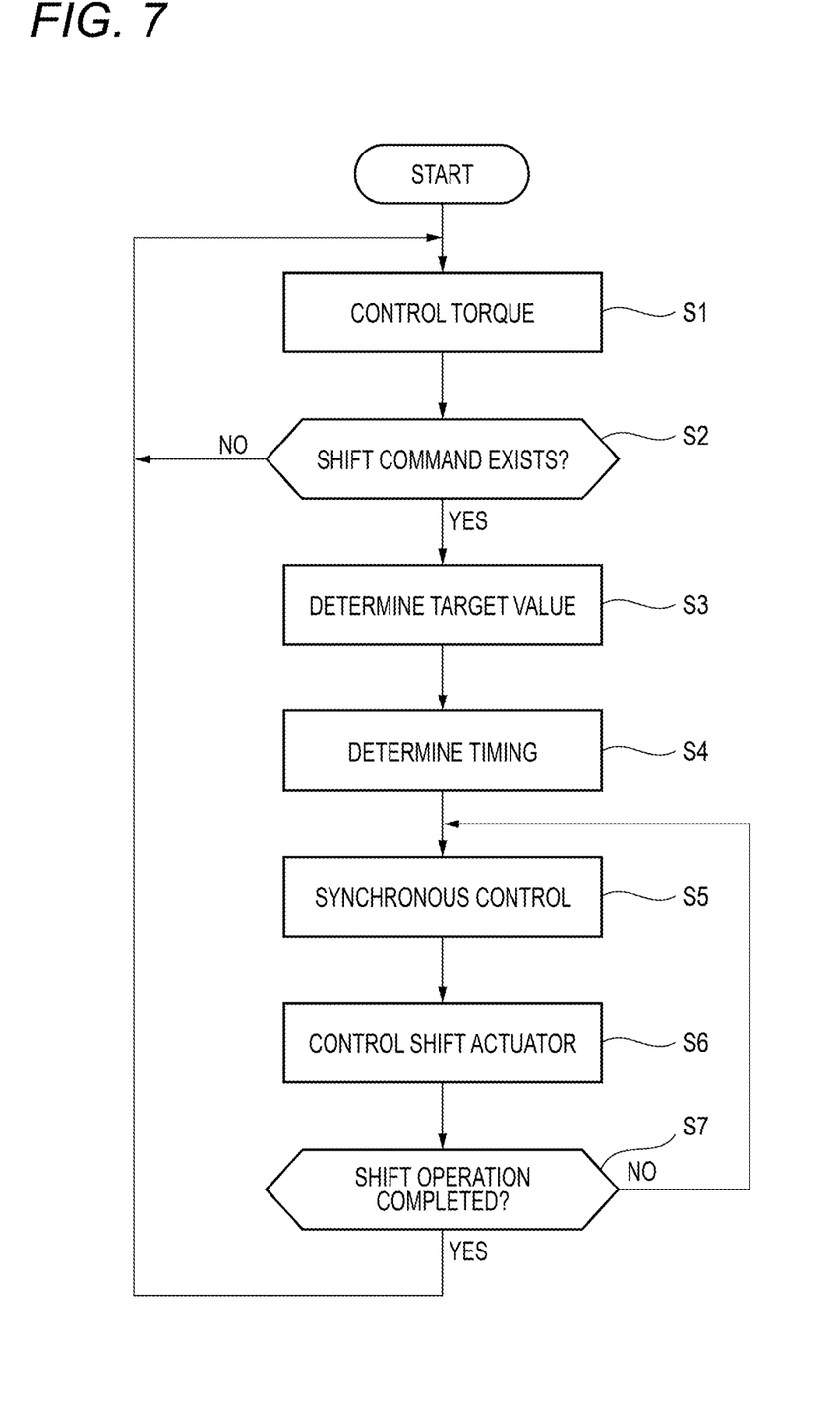
FIG. 7 is a flowchart showing a flow of control by the transmission control device during traveling of the motorcycle in FIG. 1.

An example of the transmission processing will be described with reference to FIG. 7. FIG. 7 is a flowchart showing a flow of control by the transmission control device 40 when the motorcycle 1 is traveling in the HEV mode.

During the traveling in the HEV mode, the engine control unit 41b and the motor control unit 41c basically perform the torque control described above (step S1). During the torque control, the shift control unit 41e determines whether a shift command (that is, a shift-up command or a shift-down command) exists (step S2). When it is determined that no shift command exists (step S2: No), the torque control by the engine control unit 41b and the motor control unit 41c is continued.

(Determination on Target Value)

When it is determined that a shift command exists (step S2: Yes), the target determination unit 41f determines various target values (step S3). Specifically, the target determination unit 41f determines the target engine rotational speed, the target motor rotational speed, and the target drum angle. The target engine rotational speed and the target motor rotational speed are rotational speeds corresponding to the second transmission gear position. More specifically, the target engine rotational speed and the target motor rotational speed are the engine rotational speed and the motor rotational speed for synchronous control for bringing one of the rotational speed of the dog 24 at the second transmission gear position and the rotational speed of the transmission gear at the second transmission gear position close to the other.

Here, "synchronous control for bringing one of the rotational speed of the dog 24 at the second transmission gear position and the rotational speed of the transmission gear at the second transmission gear position close to the other" is control in which an input side of the dog 24 and the second gear 23b2 is matched with an output side. For example, when the dog 24 that rotates integrally with the input shaft 21 is engaged with the second gear 23b2 that is externally mounted on the input shaft 21, the synchronous control means control of bringing the rotational speed of the dog 24 close to the rotational speed of the second gear 23b2. In addition, for example, when the dog 24 that rotates integrally with the output shaft 22 is engaged with the second gear 23b2 that is externally mounted on the output shaft 22, the synchronous control means control of bringing the rotational speed of the second gear 23b2 close to the rotational speed of the dog 24. By performing the synchronous control before the dog 24 enters the accommodation space S of the second gear 23b2, the dog 24 is smoothly engaged with the second gear 23b2.

In the present embodiment, in step S3, the shift control unit 41e first determines the first transmission gear position, which is the current transmission gear position of the gear transmission 20, based on the detected angle signal of the gear position sensor 31. In addition, the shift control unit 41e determines the second transmission gear position, which is the next transmission gear position, in accordance with whether the shift command is a shift-up command or a shift-down command. The target determination unit 41f calculates the target engine rotational speed and the target motor rotational speed based on the reduction ratio at the second transmission gear position and the current rotational speed of the output shaft 22 such that one of the rotational speed of the dog 24 and the rotational speed of the second gear 23b2 at the second transmission gear position is matched with the other. A rotational speed of the input shaft 21 corresponding to a target engine rotational speed R1 and a rotational speed of the input shaft 21 corresponding to a target motor rotational speed R2 have the same value.

(Determination on Timing)

After step S3, the timing determination unit 41g determines a first timing Ts1, which is a timing at which the synchronous control of the engine 12 is started, a second timing Ts2, which is a timing at which the synchronous control of the drive motor 13 is started, and a third timing, which is a timing at which the control for moving the dog 24 is started (step S4).

In step S4, the timing determination unit 41g first determines the first timing Ts1 or the second timing Ts2 such that the second timing Ts2 is later than the first timing Ts1.

Specifically, the timing determination unit 41g calculates the first delay time D1 from a time point at which the synchronous control of the engine 12 is started to a first time point Tm1. The first time point Tm1 is a time point at which the output torque of the engine 12 becomes maximum before a target rotational speed of the engine 12 is reached. In addition, the timing determination unit 41g calculates a second delay time D2 from start of the synchronous control of the drive motor 13 to a second time point Tm2. The second time point Tm2 is a time point at which the output torque of the drive motor 13 becomes maximum before a target rotational speed of the drive motor 13 is reached. The first delay time D1 is longer than the second delay time D2.

The timing determination unit 41g determines the first timing Ts1 or the second timing Ts2 based on the calculated first delay time D1 and the calculated second delay time D2 such that a time difference between the first time point Tm1 and the second time point Tm2 is equal to or less than a predetermined time. For example, the timing determination unit 41g determines the first timing Ts1 or the second timing Ts2 such that the first time point Tm1 and the second time point Tm2 coincide with each other, that is, such that the time difference between the first time point Tm1 and the second time point Tm2 becomes zero.

Further, the timing determination unit 41g determines a third timing Ts3, which is a timing at which control for disengaging the dog 24 at the first transmission gear position from the first gear 23b1 and moving the dog 24 at the second transmission gear position toward the second gear 23b2 is started, based on the determined first timing Ts1 or the determined second timing Ts2. Specifically, the timing determination unit 41g determines the third timing Ts3 so as to be after the first timing Ts1 and before the first time point Tm1. In addition, the timing determination unit 41g determines the third timing Ts3 such that the dog 24 at the first time point Tm1 and the second time point Tm2 is in the non-engagement state in which the dog 24 is not engaged with any of the plurality of transmission gear pairs 23.

(Synchronous Control)

When the first timing Ts1, the second timing Ts2, and the third timing Ts3 are determined in step S4, the synchronous control (step S5) and the control of the shift actuator 30 (step S6) are performed according to the determined timings.

Specifically, the engine control unit 41b controls the engine 12 to start the synchronous control at the first timing Ts1. The engine control unit 41b feedback controls the engine 12, that is, the throttle device 12c, the ignition device 12d, and the fuel supply device 12e such that the rotational speed of the engine 12 is brought close to the target engine rotational speed R1 determined in step S3.

In addition, the motor control unit 41c controls the drive motor 13 so as to start the synchronous control at the second timing Ts2. The motor control unit 41c feedback controls the drive motor 13 such that the rotational speed of the drive motor 13 is brought close to the target motor rotational speed R2 determined in step S3.

In addition, the shift control unit 41e controls the shift actuator 30 so as to start the control for moving the dog 24 at the third timing Ts3.

The shift control unit 41e determines whether the shift operation corresponding to the shift command is completed (step S7). Specifically, the shift control unit 41e determines whether the dog 24 is engaged with the second gear 23b2. For example, the shift control unit 41e determines whether a drum angle detected by the gear position sensor 31 is the target drum angle determined in step S3.

When the shift control unit 41e does not determine that the shift operation corresponding to the shift command is completed (step S7: No), the synchronous control, that is, the feedback control of the rotational speed is continued. In addition, when the shift control unit 41e determines that the shift operation corresponding to the shift command is completed (step S7: Yes), the processing returns to the torque control in step S1.

Figure 8:
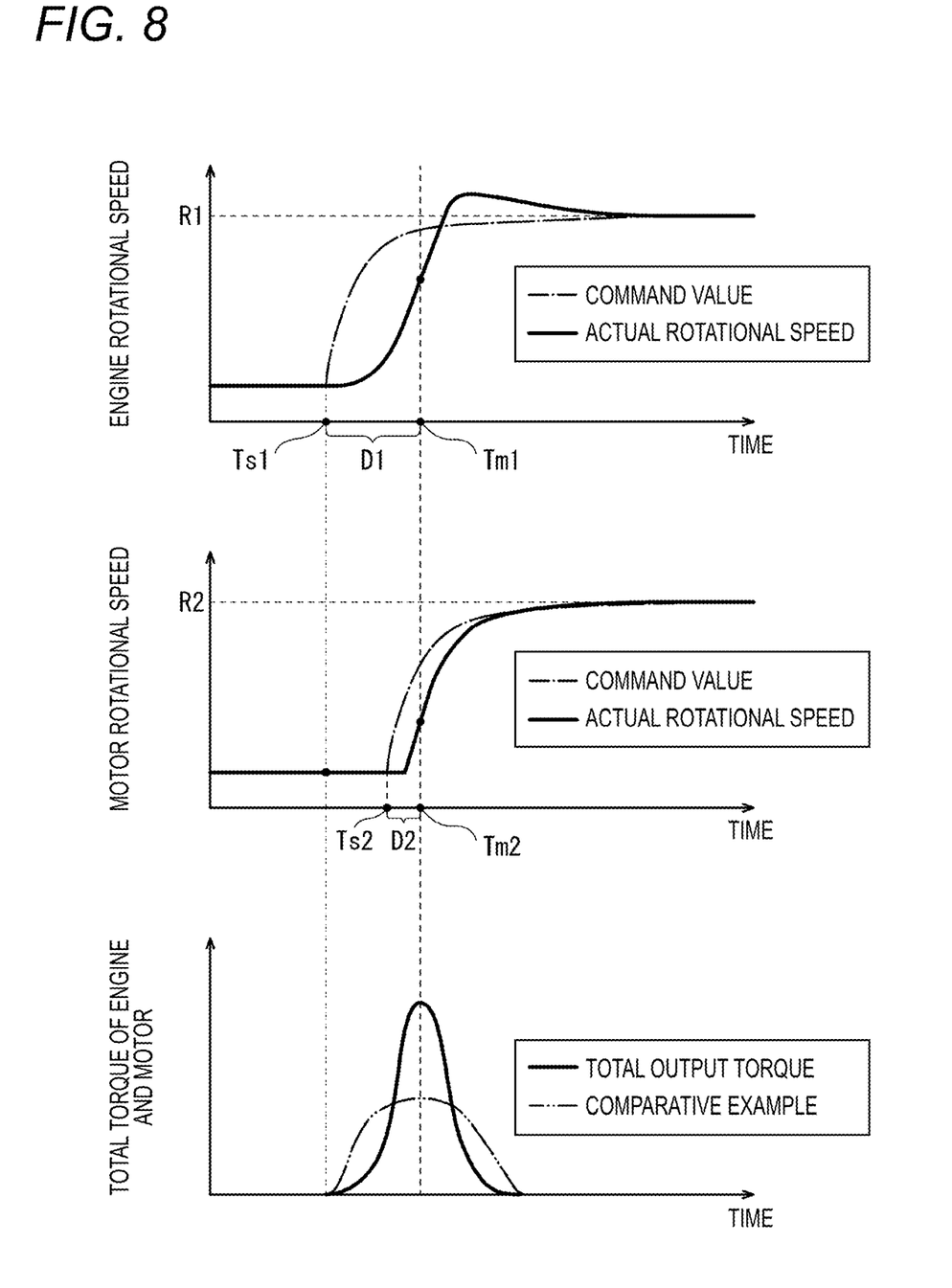
FIG. 8 is a graph showing an example of a change in engine rotational speed, a change in motor rotational speed, and a change in total output torque at the time of shift-down.

Next, the operation and effect of the transmission control device 40 according to the present embodiment will be described with reference to FIG. 8. FIG. 8 is a graph showing an example of a change in engine rotational speed, a change in motor rotational speed, and a change in total output torque when a shift-down operation is performed on the shift switch 17 during the HEV mode traveling. In FIG. 8, three graphs of the engine rotational speed, the motor rotational speed, and the total output torque are shown in a state of being arranged in the up-down direction such that time axes coincide with one another. The total output torque is the sum of the output torque of the engine 12 and the output torque of the drive motor 13 at each time point.

The top graph in FIG. 8 shows the change in engine rotational speed. In this graph, a dashed dotted line indicates a command value, that is, a command rotational speed for performing feedback control on the engine rotational speed, and a solid line indicates an actual rotational speed of the engine 12 when the engine 12 is controlled based on the command value. As shown in the graph, the actual rotational speed of the engine 12 gradually increases from the first timing Ts1 at which the synchronous control of the engine 12 is started by the engine control unit 41b. At the first time point Tm1 at which a time D1 elapsed from the first timing Ts1, a slope of the graph of the actual rotational speed of the engine 12 becomes maximum. That is, the output torque of the engine 12, in other words, a rotational acceleration of the engine 12 becomes maximum. Thereafter, the output torque of the engine 12 decreases, and the rotational speed of the engine 12 reaches the target rotational speed R1 and is maintained.

The graph in the middle of FIG. 8 shows the change in motor rotational speed. In this graph, a dashed dotted line indicates a command value, that is, a command rotational speed for performing feedback control on the motor rotational speed, and a solid line indicates an actual rotational speed of the drive motor 13 when the drive motor 13 is controlled based on the command value. As shown in this graph, the second timing Ts2 at which the drive motor 13 starts to be controlled to start the synchronous control is later than the first timing Ts1 in terms of time.

Unlike the actual rotational speed of the engine 12, the actual rotational speed of the drive motor 13 rapidly increases when a slight time elapses from the second timing Ts2 at which the synchronous control of the drive motor 13 is started by the motor control unit 41c. The reason is that an output responsiveness of the drive motor 13 to an output change command is higher than an output responsiveness of the engine 12 to an output change command. At the second time point Tm2 at which a time D2 elapses from the second timing Ts2, a slope of the graph of the actual rotational speed of the drive motor 13 becomes maximum. That is, the output torque of the drive motor 13, in other words, a rotational acceleration of the drive motor 13 becomes maximum. Thereafter, the output torque of the drive motor 13 decreases, and the rotational speed of the drive motor 13 reaches the target rotational speed R2 and is maintained.

In this way, by setting the second timing Ts2 to be after the first timing Ts1, the first time point Tm1 at which the output torque of the engine 12 becomes maximum before reaching the target rotational speed R1 of the engine 12 and the second time point Tm2 at which the output torque of the drive motor 13 becomes maximum before reaching the target rotational speed R2 of the drive motor 13 are brought close to each other. In FIG. 8, the first time point Tm1 and the second time point Tm2 are shown so as to coincide with each other in terms of time.

The lowermost graph in FIG. 8 shows the change in total output torque of the engine 12 and the drive motor 13 by a solid line. The total output torque becomes maximum at a time point corresponding to the first time point Tm1 and the second time point Tm2.

In addition, in the lowermost graph in FIG. 8, a change in total output torque of the engine 12 and the drive motor 13 according to a comparative example is indicated by a dashed doubled-dotted line. The comparative example is the total output torque when the synchronous control of the drive motor 13 is started at the first timing Ts1 at which the synchronous control of the engine 12 is started. In other words, the total output torque indicated by the dashed doubled-dotted line is the total output torque when the synchronous control of the engine 12 and the synchronous control of the drive motor 13 are simultaneously started.

The total output torque of the comparative example increases relatively earlier than the total output torque of the present embodiment from the time point at which the synchronous control of the engine 12 is started. The reason is high output responsiveness of the drive motor 13. That is, when the synchronous control of the engine 12 and the drive motor 13 is started at the same timing, among the torque applied to the input shaft 21, the torque applied from the drive motor 13 is first dominant, and thereafter, the torque applied from the engine 12 is dominant. Therefore, in the comparative example, since the time point at which the output torque of the engine 12 becomes maximum and the time point at which the output torque of the drive motor 13 becomes maximum are relatively apart from each other, the total output torque or the rotational speed of the input shaft 21 changes gently as a whole.

In addition, a peak value of the total output torque according to the present embodiment is higher than that of the total output torque according to the comparative example. The reason is that the time point at which the output torque of the engine 12 becomes maximum and the time point at which the output torque of the drive motor 13 becomes maximum are relatively close to or the same as each other. Accordingly, the rotational speed of the input shaft 21 can be greatly changed in a short time in the vicinity of the time point at which the torque transmitted to the input shaft 21 by the engine 12 becomes maximum. Therefore, it is easy to match the rotational speed of the dog 24 and the rotational speed of the second gear 23b2, and as a result, smooth engagement of the dog 24 with the second gear 23b2 can be implemented.

In addition, in the present embodiment, the time difference between the first time point Tm1 and the second time point Tm2, that is, the time difference between the time point at which the torque transmitted from the engine 12 to the input shaft 21 becomes maximum and the time point at which the torque transmitted from the drive motor 13 to the input shaft 21 becomes maximum, is set to be equal to or less than the predetermined time. Accordingly, it is easy to rapidly change the rotational speed of the input shaft 21 in the vicinity of the time point at which the torque transmitted from the engine 12 to the input shaft 21 becomes maximum.

In addition, in the present embodiment, the processor 41 determines the first timing Ts1 or the second timing Ts2 such that the first time point Tm1 and the second time point Tm2 coincide with each other. Accordingly, the control for rapidly changing the rotational speed of the input shaft 21 can be implemented by a simpler method in the vicinity of the time point at which the torque transmitted from the engine 12 to the input shaft 21 becomes maximum.

In addition, in the present embodiment, a control start timing of the shift actuator 30 is also determined based on the determined first timing Ts1 or the determined second timing Ts2. Therefore, it is easy to perform control for performing smooth engagement at the time of moving the dog 24.

In addition, in the present embodiment, the processor 41 determines the third timing Ts3 so as to be after the first timing Ts1 and before the first time point Tm1. The movement of the dog 24 can be started before the time point at which the torque transmitted from the engine 12 to the input shaft 21 becomes maximum. Therefore, it is possible to prevent a rapid increase in the rotational speed difference of the dog 24 or the first gear 23b1 before the dog 24 starts to move and is completely disengaged from the first gear 23b1, and thus it is possible to prevent the second surface 25b of the first gear 23b1 from colliding with the dog 24.

In addition, in the present embodiment, the third timing Ts3 is determined such that the dog 24 at the first time point Tm1 and the second time point Tm2 is in the non-engagement state in which the dog 24 is not engaged with any of the plurality of transmission gear pairs 23. Therefore, it is possible to further prevent a rapid increase in the rotational speed difference of the dog 24 or the first gear 23b1 before the dog 24 starts to move and is completely disengaged from the first gear 23b1.

Figure 9:
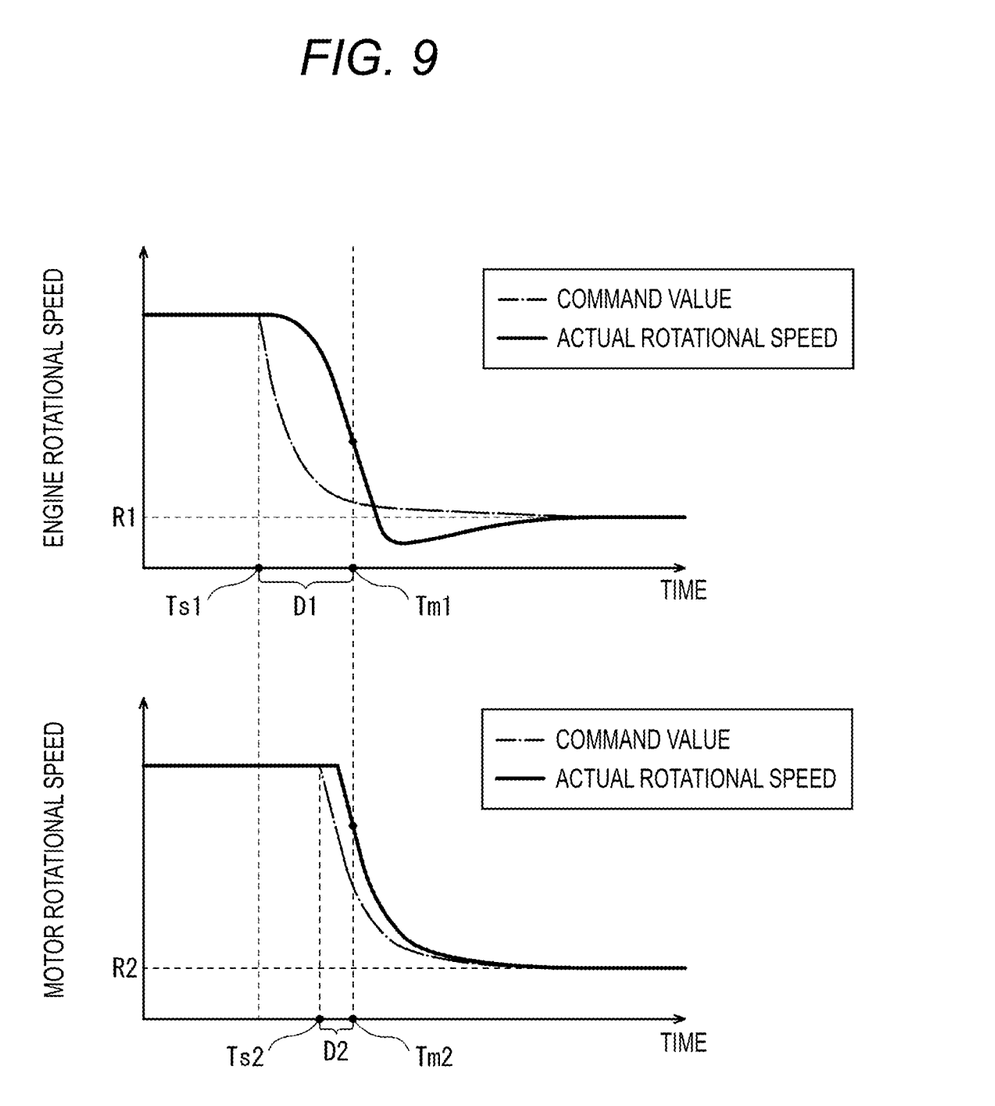
FIG. 9 is a graph showing an example of a change in engine rotational speed and a change in motor rotational speed at the time of shift-up.

FIG. 9 is a graph showing an example of a change in engine rotational speed and a change in motor rotational speed at the time of shift-up. Although the change in engine rotational speed, the change in motor rotational speed, and the change in total output torque when a shift command for shift-down exists are shown together with FIG. 8, the transmission control device 40 achieves the same effects not only when a shift-down command exists but also when a shift-up command exists. FIGS. 8 and 9 are different from each other in whether the rotational speed is increased or decreased, and thus the description of FIG. 9 will be omitted.

First Modification

Even in the case of the same type of prime mover, an individual difference may exist in prime movers in terms of torque characteristics, output responsiveness, and the like. When such an individual difference exists, in a case where a method for determining a start timing of synchronous control capable of implementing smooth engagement and disengagement of a dog by a certain prime mover is applied to another prime mover, there is a possibility that smooth engagement and disengagement of the dog cannot be implemented by another prime mover. In the present first modification, such a problem is solved.

That is, in the transmission control device 40 according to the first modification, a behavior parameter indicating a behavior of the dog 24 when the synchronous control based on the first timing Ts1 or the second timing Ts2 determined by the processor 41 (more specifically, the timing determination unit 41g) is performed is stored in the memory 42 as past data in association with timing information relating to the first timing Ts1 or the second timing Ts2.

The past data may include the behavior parameter and timing information relating to at least one of the first timing Ts1, the second timing Ts2, and the third timing Ts3. The timing information can be obtained relating to a method for determining at least one of the first timing Ts1, the second timing Ts2, and the third timing Ts3, for example, a method for calculating a first delay time, a method for calculating a second delay time, a time interval between the first timing Ts1 (or the second timing Ts2) and the third timing, and the like. For example, the past data may be stored in the memory 42. The timing determination unit 41g may consider the behavior parameter of a plurality of pieces of past data.

The behavior parameter may be a parameter that directly or indirectly indicates the behavior of the dog 24. As the behavior parameter, a rotation angle of the shift drum 29 detected by the gear position sensor 31 is exemplified. The reason is that presence or absence of a collision between the dog 24 and the transmission gear pair 23 and a magnitude of the collision can be grasped by the rotation angle of the shift drum 29. It is desirable that by the behavior parameter, whether the dog 24 can be smoothly disengaged from the transmission gear 23 at the first transmission gear position or the dog 24 can be smoothly engaged with the transmission gear 23 at the second transmission gear position can be grasped.

At the time of determining the first timing Ts1 or the second timing Ts2 next time or later, the processor 41 determines the first timing Ts1 or the second timing Ts2 in consideration of the behavior parameter of the past data stored in the memory 42. At the time of determining the first timing Ts1 or the second timing Ts2 next time or later, the processor 41 may determine at least one of the first timing Ts1, the second timing Ts2, and the third timing Ts3 in consideration of the behavior parameter of the past data stored in the memory 42.

The method for determining the timing in consideration of the past data is not particularly limited. For example, the processor 41 may determine, by executing a predetermined determination program stored in the memory 42, whether the past data stored in the memory 42 is success data relating to success of smooth engagement or disengagement of the dog 24 or failure data relating to failure. In this case, when the past data is the success data, the processor 41 may determine the first timing Ts1 or the second timing Ts2 using the same method as in the previous time even in the next time or later. When the past data is the failure data, the processor 41 may correct, by a predetermined correction method, the first timing Ts1 or the second timing Ts2 calculated by a method corresponding to the failure data in the next or later timing determination. It is considered that as the correction method, a method for calculating the delay time may be changed, or a time interval between the third timing Ts3 and the first timing Ts1 may be changed.

According to the first modification, even when an individual difference exists in the prime movers, various timings are determined in consideration of the past data corresponding to each prime mover. Therefore, it is possible to compensate for variations in the characteristics of the respective prime movers so as to implement smooth engagement or disengagement of the dog 24.

Second Modification

Even in the case of the same prime mover, torque characteristics, output responsiveness, and the like may change in accordance with environmental factors. For example, when the viscosity of a coolant (for example, oil) that cools an engine decreases due to an increase in temperature of the coolant, mechanical loss of the engine is caused, and the engine characteristics may be affected. Therefore, even when smooth engagement and disengagement of the dog can be implemented in a certain situation with respect to a certain prime mover, there is a possibility that smooth engagement and disengagement of the dog cannot be implemented in another situation. In the present second modification, such a problem is solved.

That is, in the transmission control device 40 according to the second modification, the processor 41 acquires an environmental parameter that affects the output responsiveness or the torque characteristics of the engine 12 or the drive motor 13. As the environmental parameter, the temperature of the coolant that cools the engine 12 by the coolant temperature sensor 36 is exemplified. The reason is that the viscosity of the coolant, which decreases with an increase in the temperature of the coolant, may affect the torque characteristics and the output responsiveness of the engine 12. The processor 41 may acquire a plurality of types of environmental parameters.

The processor 41 determines the first timing Ts1 or the second timing Ts2 based on the acquired environmental parameter. The processor 41 may determine at least one of the first timing Ts1, the second timing Ts2, and the third timing Ts3 based on the environmental parameter. For example, correspondence relation information indicating a correspondence relation between a value of the environmental parameter and the first delay time D1 or a correspondence relation between the value of the environmental parameter and the second delay time D2 may be stored in the memory 42. In this case, the processor 41 may determine at least one of the first delay time D1 and the second delay time D2 based on the acquired environmental parameter and the information indicating the correspondence relation stored in the memory 42.

According to the second modification, the timing can be appropriately determined in accordance with the environment and the situation in which the device is used.

The environmental parameter is not limited to the temperature of the coolant. For example, the motorcycle 1 may include an atmospheric pressure sensor that detects an atmospheric pressure at a location where the motorcycle 1 exists, and the environmental parameter may include the atmospheric pressure detected by the atmospheric pressure sensor.

Other Embodiments

The present disclosure is not limited to the embodiments described above, and the configuration thereof can be changed, added, or deleted.

For example, in the above embodiment, the dogs 24 are integrated with the co-rotation gears 23a, but the dogs 24 may be separate from the co-rotation gears 23a. For example, instead of making the co-rotation gear 23a slidable with respect to the input shaft 21 or the output shaft 22, a dog ring including the dog 24 may be provided so as to be slidable with respect to the input shaft 21 or the output shaft 22. In addition, the dogs may not be disposed around both the input shaft 21 and the output shaft 22, and the dogs at all the transmission gear positions may be disposed around only one of the input shaft 21 and the output shaft 22.

In FIGS. 3 to 5, the transmission gear 23 including both the dog 24 at the first transmission gear position that is the current transmission gear position and the dog 24 at the second transmission gear position that is the next transmission gear position is shown, but the gear transmission may not include such a transmission gear. That is, the dog 24 at the first transmission gear position and the dog 24 at the second transmission gear position, which is the next transmission gear position, may be provided in separate transmission gears 23, or may be provided in separate dog rings.

The first timing or the second timing may be a variable timing that is changed in accordance with a predetermined setting condition. The timing determination unit may determine the first timing or the second timing in accordance with at least one of the gear ratio at the first transmission gear position, the rotational speed of the input shaft at the first transmission gear position, the rotational speed of the output shaft at the first transmission gear position, the gear ratio (that is, the reduction ratio) at the second transmission gear position, the rotational speed of the input shaft at the second transmission gear position, the rotational speed of the output shaft at the second transmission gear position, the output torque of the engine 12, and the output torque of the drive motor 13. For example, the timing determination unit 41g may change the first delay time D1 based on the engine rotational speed, the transmission ratio, presence or absence of acceleration or deceleration, gear up or down, the vehicle speed, a charged or discharged state of an integrated starter generator (ISG), a torque map, an intake air amount, and an air-fuel ratio. In addition, the timing determination unit 41g may change the second delay time D2 based on a battery temperature, a motor temperature, an allowable discharge amount of a battery, the torque map, the transmission ratio, the presence or absence of acceleration or deceleration, the gear up or down, and the vehicle speed.

In addition, in the above embodiment, an example in which the first prime mover is an internal combustion engine and the second prime mover is an electric motor has been described, but the types of the first prime mover and the second prime mover are not limited thereto. For example, the first prime mover or the second prime mover may be an internal combustion engine, an external combustion engine, an electric motor, a fluid machine, or the like. The type of the engine is not particularly limited, and for example, may be a reciprocating engine or a rotary engine. For example, the engine may be a gasoline engine or a diesel engine. For example, the engine may be a two-stroke engine or a four-stroke engine. The first prime mover and the second prime mover may be the same type of prime mover.

In addition, in the above embodiment, since the first prime mover is an internal combustion engine and the second prime mover is an electric motor, the output responsiveness of the electric motor is always higher than the output responsiveness of the internal combustion engine. However, depending on the type of the prime mover, the output responsiveness of one of the two prime movers may become higher or lower than the output responsiveness of the other prime mover depending on conditions such as the temperature and the output torque of each prime mover. In such a case, the processing circuit may determine which one of the two prime movers has a high output responsiveness based on a situation in which the shift command is acquired. The prime mover having a high output responsiveness may be used as the second prime mover, and the prime mover having a low output responsiveness may be used as the first prime mover. This kind of determination is unnecessary in the case of using two prime movers in which the output responsiveness of one prime mover is always higher than the output responsiveness of the other output responsiveness.

In this way, the first prime mover and the second prime mover may transmit both the driving force of the first prime mover and the driving force of the second prime mover to the input shaft of the gear transmission, and may have a relation in which the output responsiveness of the second prime mover to the output change command is higher or may be higher than the output responsiveness of the first prime mover to the output change command.

The method for determining the first timing and the second timing is not limited to the method described in the above embodiment. For example, in the above embodiment, the first timing or the second timing is determined such that the first time point at which the engine output torque becomes maximum from the time point at which the synchronous control of the engine is started coincides with the second time point at which the motor output torque becomes maximum from the time point at which the synchronous control of the motor is started.

In addition, in the above embodiment, the first timing and the second timing are determined based on the first delay time up to the first time point and the second delay time up to the second time point, but the method for determining the first timing and the second timing is not limited thereto. For example, only one of the first timing and the second timing may be determined based on the first delay time and the second delay time. For example, only the second timing may be determined based on the first delay time and the second delay time, and the first timing may be determined to be started after the second timing is determined. One or both of the first timing and the second timing may be determined based on only one of the first delay time and the second delay time.

In addition, the method for determining the third timing, which is the timing at which the control for moving the dog is started, is not limited to the method described in the above embodiment.

For example, in the above embodiment, the third timing is determined based on the first timing or the second timing, but the third timing may be determined regardless of the first timing or the second timing.

For example, in the above embodiment, the third timing is determined such that the dog at the first time point and the second time point is in the non-engagement state in which the dogs are not engaged with any of the plurality of transmission gear pairs, but the third timing may be determined such that the dog at the first time point and the second time point is in a state of entering an accommodation space of the transmission gear pair at the first transmission gear position.

For example, in the above embodiment, the third timing is determined to be after the first timing and before the first time point, but the third timing may be before the first timing or after the first time point.

The shift command may be transmitted from another device instead of the shift switch. In addition, the transmission control device may automatically generate the shift command. For example, the transmission control device may store a transmission map that defines a relation among the vehicle speed, the engine rotational speed, throttle opening, and transmission timing, or may automatically generate the shift command based on the transmission map.

The vehicle is not limited to a motorcycle. For example, the vehicle may be, for example, a motor tricycle or a four-wheeled motor vehicle. In the above embodiment, the transmission control device 40 for the power system of the motorcycle 1 has been described, but the transmission control device can also be applied to a power system of another type of vehicle such as a motor tricycle or a four-wheeled motor vehicle.

In addition, the transmission control device is also applicable to a shift operation in a system other than a power system of a vehicle, such as a machine tool.

The functions of the elements disclosed in the present description can be executed using a circuit or a processing circuit including a general-purpose processor, a dedicated processor, an integrated circuit, application specific integrated circuits (ASIC), a circuit in the related art, or any combination thereof, which are configured or programmed to execute the disclosed functions. Since the processor includes a transistor and other circuits, the processor is regarded as a processing circuit or a circuit. In the present disclosure, a circuit, a unit, or a means is hardware that executes the listed functions or hardware that is programmed to execute the listed functions. The hardware may be hardware disclosed in the present description, or may be other known hardware that is programmed or configured to execute the listed functions. In a case of a processor in which the hardware is considered to be a type of circuit, the circuit, the means, or the unit is a combination of hardware and software, and the software is used for the configuration of the hardware or the processor.

A transmission control device according to an aspect of the present disclosure is a transmission control device that in a system including a first prime mover and a second prime mover different from each other in output responsiveness to an output change command, and a gear transmission including an input shaft and an output shaft to which a driving force of the first prime mover and a driving force of the second prime mover are transmitted, a plurality of transmission gears, and a dog that moves with respect to the input shaft and the output shaft and is selectively engaged with one of the plurality of transmission gears, the first prime mover and the second prime mover are controlled. The control device comprises a processing circuit. The processing circuit is configured to calculate a target rotational speed of the first prime mover and a target rotational speed of the second prime mover for synchronous control for bringing one of a rotational speed of the dog at a second transmission gear position and a rotational speed of the transmission gear at the second transmission gear position close to the other in accordance with a shift command for shifting from a first transmission gear position to the second transmission gear position, and determine a first timing, which is a timing at which the synchronous control of the first prime mover is started, or a second timing, which is a timing at which the synchronous control of the second prime mover is started, such that the second timing is later than the first timing.

According to the above configuration, when the output responsiveness of the second prime mover is higher than the output responsiveness of the first prime mover, the second timing is set after the first timing, such that the first time point at which the output torque of the first prime mover becomes maximum and the second time point at which the output torque of the second prime mover becomes maximum are brought close to each other. Accordingly, the rotational speed of the input shaft can be significantly changed in a short time in the vicinity of the time point at which the torque transmitted to the input shaft by the first prime mover and the second prime mover becomes maximum. Therefore, the rotational speed of the dog and the transmission gear can be easily matched during the shift operation, and as a result, smooth engagement of the dog with the transmission gear can be implemented.

The first timing or the second timing may be a variable timing that is changed in accordance with a predetermined setting condition.

The processing circuit may calculate a first delay time from start of the synchronous control of the first prime mover to the first time point at which the output torque of the first prime mover becomes maximum until the target rotational speed of the first prime mover is reached, calculate a second delay time from start of the synchronous control of the second prime mover to the second time point at which the output torque of the second prime mover becomes maximum until the target rotational speed of the second prime mover is reached, and determine the first timing or the second timing based on the calculated first delay time and the calculated second delay time such that a time difference between the first time point and the second time point is equal to or less than a predetermined time. According to this configuration, the rotational speed of the input shaft can be easily changed rapidly in the vicinity of the time point at which the torque transmitted from the first prime mover to the input shaft becomes maximum.

The processing circuit may determine the first timing or the second timing such that the first time point and the second time point coincide with each other. Accordingly, the control for rapidly changing the rotational speed of the input shaft in the vicinity of the time point at which the torque transmitted from the first prime mover to the input shaft becomes maximum can be implemented by a simpler method.

The system may further include a shift actuator that is controlled by the transmission control device and generates power for moving the dog, and the processing circuit may determine a third timing, which is a timing at which control for moving the dog is started, based on the determined first timing or the determined second timing. According to this configuration, the control start timing of the shift actuator is also determined based on the determined first timing or the determined second timing. Therefore, it is easy to perform control for performing smooth disengagement and engagement at the time of moving the dog.

The processing circuit may calculate a first delay time from start of the synchronous control of the first prime mover to a first time point at which the output torque of the first prime mover becomes maximum until the target rotational speed of the first prime mover is reached, and determine the third timing so as to be after the first timing and before the first time point. Accordingly, the movement of the dog can be started before the time point at which the torque transmitted from the first prime mover to the input shaft becomes maximum. Therefore, it is possible to prevent a rapid increase in a rotational speed difference of the dog at the first transmission gear position or the gear pair at the first transmission gear position before the dog at the first transmission gear position starts to move and is completely disengaged from the transmission gear at the first transmission gear position, and thus it is possible to prevent collision between the gear pair and the dog at the previous transmission gear position.

The processing circuit may calculate a first delay time from start of the synchronous control of the first prime mover to a first time point at which output torque of the first prime mover becomes maximum until the target rotational speed of the first prime mover is reached, calculate a second delay time from start of the synchronous control of the second prime mover to a second time point at which output torque of the second prime mover becomes maximum until the target rotational speed of the second prime mover is reached, and determine the third timing such that the dog at the first time point and the second time point is in a non-engagement state in which the dog is not engaged with any of the plurality of transmission gears. Accordingly, it is possible to further prevent a rapid increase in the rotational speed difference of the dog or the gear pair at the previous transmission gear position.

A memory configured to store, as past data, a behavior parameter indicating a behavior of the dog when the synchronous control is performed based on the first timing or the second timing determined by the processing circuit in association with timing information relating to the first timing or the second timing may be further included, and the processing circuit may determine the first timing or the second timing in consideration of the past data at the time of determining the first timing or the second timing next time or later. Accordingly, even when an individual difference exists in the prime movers, it is possible to compensate for a variation in the characteristics of each prime mover so as to implement smooth engagement or disengagement of the dog in consideration of the past data corresponding to each prime mover.

The processing circuit may acquire an environmental parameter that affects the output responsiveness or torque characteristics of the first prime mover or the second prime mover, and determine the first timing or the second timing based on the environmental parameter. Accordingly, it is possible to appropriately determine a timing in accordance with the environment and the situation in which the device is used.

The processing circuit may determine the first timing or the second timing in accordance with at least one of a gear ratio at the first transmission gear position, a rotational speed of the input shaft at the first transmission gear position, a rotational speed of the output shaft at the first transmission gear position, a gear ratio at the second transmission gear position, a rotational speed of the input shaft at the second transmission gear position, a rotational speed of the output shaft at the second transmission gear position, output torque of the first prime mover, and output torque of the second prime mover.

The first prime mover is an internal combustion engine, and the second prime mover is an electric motor. For example, the present disclosure can be applied to a transmission control device mounted on a hybrid vehicle.

What is claimed is:

1. A transmission control device configured to control a first prime mover and a second prime mover of which output responsiveness to an output change command is different from each other in a system, the system including the first prime mover, the second prime mover, and a gear transmission, the gear transmission including an input shaft to which a driving force of the first prime mover and a driving force of the second prime mover are transmitted, an output shaft, a plurality of transmission gears, and a dog configured to move to the input shaft and the output shaft to be engaged selectively with one of the plurality of transmission gears, the control device comprising:

a processing circuitry, wherein
the transmission control device causes the processing circuitry to execute a process, the process including:
in response to a shift command for shifting from a first transmission gear position to a second transmission gear position, calculating a target rotational speed of the first prime mover and a target rotational speed of the second prime mover for a synchronous control that brings one of a rotational speed of the dog at the second transmission gear position and a rotational speed of the transmission gear at the second transmission gear position close to the other; and
determining a first timing or a second timing such that the second timing is later than the first timing, the first timing being a time at which the synchronous control of the first prime mover is started, and the second timing being a time at which the synchronous control of the second prime mover is started.

2. The transmission control device according to claim 1, wherein
the first timing or the second timing is a variable timing that is changed in accordance with a predetermined setting condition.

3. The transmission control device according to claim 1, wherein
the transmission control device causes the processing circuitry to execute the process, the process further including:
calculating a first delay time from a start time point at which the synchronous control of the first prime mover is started to a first time point at which output torque of the first prime mover becomes maximum until the target rotational speed of the first prime mover is reached;

calculating a second delay time from a start time point at which the synchronous control of the second prime mover is started to a second time point at which output torque of the second prime mover becomes maximum until the target rotational speed of the second prime mover is reached; and determining the first timing or the second timing based on the calculated first delay time and the calculated second delay time such that a time difference between the first time point and the second time point is equal to or less than a predetermined time.

4. The transmission control device according to claim 3, wherein
the transmission control device causes the processing circuitry to execute the process, the process further including:
determining the first timing or the second timing such that the first time point and the second time point coincide with each other.

5. The transmission control device according to claim 1, wherein
the system further includes a shift actuator controlled by the transmission control device and configured to generate power for moving the dog, and
the transmission control device causes the processing circuitry to execute the process, the process further including:
determining a third timing based on the determined first timing or the determined second timing, the third timing being a time at which control for moving the dog is started.

6. The transmission control device according to claim 5, wherein
the transmission control device causes the processing circuitry to execute the process, the process further including:
calculating a first delay time from a start point at which the synchronous control of the first prime mover is stared to a first time point at which output torque of the first prime mover becomes maximum until the target rotational speed of the first prime mover is reached; and
determining the third timing to be after the first timing and before the first time point.

7. The transmission control device according to claim 5, wherein
the transmission control device causes the processing circuitry to execute the process, the process further including:
calculating a first delay time from a start point at which the synchronous control of the first prime mover is started to a first time point at which output torque of the first prime mover becomes maximum until the target rotational speed of the first prime mover is reached;
calculating a second delay time from a start point at which the synchronous control of the second prime mover is started to a second time point at which output torque of the second prime mover becomes maximum until the target rotational speed of the second prime mover is reached; and
determining the third timing such that the dog at the first time point and the second time point is in a non-engagement state where the dog is not engaged with any of the plurality of transmission gears.

8. The transmission control device according to claim 1, further comprising:
a memory configured to store, as past data, a behavior parameter indicating a behavior of the dog when the synchronous control is performed based on the first timing or the second timing determined by the processing circuitry in association with timing information relating to the first timing or the second timing, wherein
the transmission control device causes the processing circuitry to execute the process, the process further including:
determining the first timing or the second timing in consideration of the past data when determining the first timing or the second timing from next time.

9. The transmission control device according to claim 1, wherein
the transmission control device causes the processing circuitry to execute the process, the process further including:
acquiring an environmental parameter that affects the output responsiveness or torque characteristics of the first prime mover or the second prime mover; and
determining the first timing or the second timing based on the environmental parameter.

10. The transmission control device according to claim 1, wherein
the transmission control device causes the processing circuitry to execute the process, the process further including:
determining the first timing or the second timing in accordance with at least one of:
a gear ratio at the first transmission gear position;
a rotational speed of the input shaft at the first transmission gear position;
a rotational speed of the output shaft at the first transmission gear position;
a gear ratio at the second transmission gear position;
a rotational speed of the input shaft at the second transmission gear position;
a rotational speed of the output shaft at the second transmission gear position;
output torque of the first prime mover; and
output torque of the second prime mover.

11. The transmission control device according to claim 1, wherein
the first prime mover is an internal combustion engine, and the second prime mover is an electric motor.

12. The transmission control device according to claim 1, wherein
the output responsiveness to the output change command of the second prime mover is greater than the output responsiveness to the output change command of the first prime mover.

* * * * *